(No Model.)

G. F. SIMONDS.
BALL BEARING.

No. 449,966. Patented Apr. 7, 1891.

Witnesses.
Robert Garrett,
Geo. W. Rea.

Inventor:
George F. Simonds.
By James L. Norris,
Atty.

THE NORRIS PETERS CO., PHOTO-LITHO., WASHINGTON, D. C.

UNITED STATES PATENT OFFICE.

GEORGE F. SIMONDS, OF FITCHBURG, MASSACHUSETTS.

BALL-BEARING.

SPECIFICATION forming part of Letters Patent No. 449,966, dated April 7, 1891.

Application filed December 30, 1890. Serial No. 376,292. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to ball-bearings for diminishing friction; and it consists in a cage composed of thin sheet metal stamped to the proper shape and provided with perforated concavo-convex pockets to receive and retain the spherical rollers or balls in a ball-bearing and allow them to revolve in suitable position to sustain the pressure of the moving surfaces with which they are placed in contact.

Figure 1:
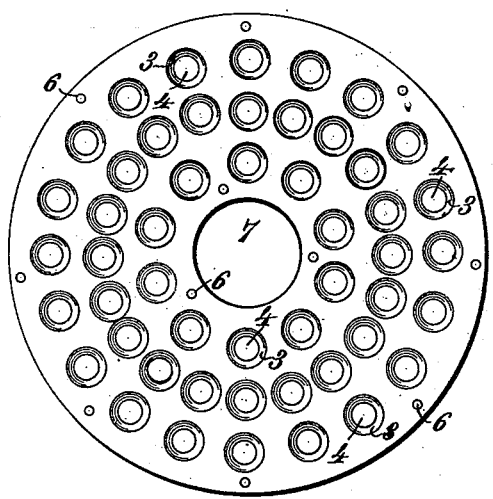
Figure 2:
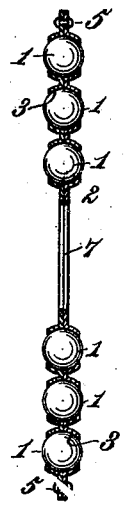

In the annexed drawings, Figure 1 is a plan of the inner side of a sheet-metal cage constructed according to my invention and provided with centrally-perforated concavo-convex pockets or recesses to receive the spherical rollers or balls of a ball-bearing. Fig. 2 is a transverse section of a cage with balls confined therein.

Referring to the drawings, the numeral 1 designates the spherical rollers or balls, and 2 denotes the cage. In constructing this cage a thin plate of sheet metal is stamped and punched by means of suitable dies and punches in such a manner as to form in the metal sheet a number of concavo-convex centrally-perforated hemispherical pockets or recesses 3, arranged at suitable intervals. Each pocket or recess 3 is adapted to receive and confine or hold a separate spherical roller or ball 1 in position to partly project through the perforation 4 in the center of said pocket. A single recessed and perforated metal sheet, Fig. 1, may be employed to hold the balls in place in a suitable box; but I prefer in most cases to secure together two of such metal sheets by means of bolts, screws, or rivets 5, as shown in Fig. 2, especially when the cage is to be used without boxing. The bolts, rivets, or screws 5 will be placed at suitable points in perforations 6 around the edges of the contacting metal sheets and elsewhere if required and when the cage is provided with a central opening 7 to surround a shaft, axle, or other rotary part the edges of said opening will be secured and strengthened in like manner.

It will be observed that the recesses or hemispherical pockets 3 present convex surfaces on the exterior of the cage and are concave internally to correspond with the spherical surfaces of the balls that are retained in proper position within the cage by said pockets when the cage is removed from the bearing-surfaces, against which the balls are designed to act.

A ball-carrying cage of this construction is light, durable, and comparatively inexpensive, and possesses many obvious advantages for use in situations where a heavy or more expensive ball-bearing cage would be objectionable or impracticable.

What I claim as my invention is—

1. In a ball-bearing, the combination, with the spherical rollers or balls, of a removable cage provided with perforated concavo-convex pockets to receive and hold said balls, the cage and balls being removable in a body, substantially as described.

2. In a ball-bearing, the combination, with spherical rollers or balls, of a removable cage composed of sheet-metal plates provided with concavo-convex centrally-perforated pockets to retain the balls, the cage and balls being removable in a body, substantially as described.

In testimony whereof I have hereunto set my hand and affixed my seal in presence of two subscribing witnesses.

GEO. F. SIMONDS. [L. S.]

Witnesses:
JAMES L. NORRIS,
JAMES A. RUTHERFORD.